United States Patent [19]

Ishii et al.

[11] Patent Number: 5,148,297
[45] Date of Patent: Sep. 15, 1992

[54] LIQUID CRYSTAL DISPLAY DEVICE HAVING AN OPTICAL FIBER SUBSTRATE INCLUDING FIBERS WHOSE PERIPHERY IS COATED WITH A CONDUCTIVE MATERIAL

[75] Inventors: Yutaka Ishii; Naofumi Kimura; Seiichi Mitsui; Mariko Ban, all of Nara, Japan

[73] Assignee: Sharp Kabushiki Kaisha, Osaka, Japan

[21] Appl. No.: 728,976

[22] Filed: Jul. 12, 1991

[30] Foreign Application Priority Data

Jul. 12, 1990 [JP] Japan .................. 2-185787

[51] Int. Cl.$^5$ ................................. G02F 1/13
[52] U.S. Cl. ........................ 359/53; 359/42; 359/82
[58] Field of Search ............ 350/335, 339 F, 339 R, 350/334, 96.13, 338; 359/42, 62, 82, 88, 53

[56] References Cited

U.S. PATENT DOCUMENTS

| | | | |
|---|---|---|---|
| 4,508,427 | 4/1985 | Ross | 350/335 |
| 4,643,530 | 2/1987 | Yamazaki | 350/339 R |
| 4,842,379 | 6/1989 | Oishi et al. | 350/335 X |
| 4,913,531 | 4/1990 | Efron et al. | 350/338 X |
| 5,035,489 | 7/1991 | Iijima et al. | 350/335 |

Primary Examiner—Stanley D. Miller
Assistant Examiner—Huy K. Mai
Attorney, Agent, or Firm—David G. Conlin; Robert F. O'Connell

[57] ABSTRACT

A liquid crystal display includes a plurality of laminated liquid crystal layers and a transparent substrate interposed between the liquid crystal layers, the transparent substrate being formed of an aggregate of optical fibers arranged so that a ray may be introduced between main and back surfaces of the substrate, whereby aberration of a display image of adjacent liquid crystal layers caused by a difference of a viewing angle can be prevented.

9 Claims, 5 Drawing Sheets

LIQUID CRYSTAL DISPLAY DEVICE HAVING AN OPTICAL FIBER SUBSTRATE INCLUDING FIBERS WHOSE PERIPHERY IS COATED WITH A CONDUCTIVE MATERIAL

BACKGROUND OF THE INVENTION

1. Field of the Invention

The present invention relates to a liquid crystal display which is mainly used in an office automation equipment such as a word processor or a notebook type personal computer, various visual apparatus or a game machine.

2. Description of the Prior Art

A visual apparatus is widely used over a large field such as a watch, a desk calculator, a computer terminal, a word processor or a TV at the present time. A typical display mode used in these uses is a TN (Twisted Nematic) mode in which a liquid crystal molecule in a liquid crystal cell is twisted by almost 90° as initial orientation. In the TN mode a liquid crystal cell is arranged between a pair of polarizers and monochromatic display is provided using an optical property of this cell, more specifically, using optical rotatory power when no voltage is applied and a depolarization characteristic when a voltage is applied. In addition, in the case of coloring, for example red, blue and green color filters are provided in the liquid crystal cell and then multicolor display or full-color display is provided by additive color mixture using the above described optical switching characteristic of the TN mode. The principle therein is used in display of a pocket-sized liquid crystal television using active matrix drive or simple matrix drive.

As a display mode widely used in display for a word processor, there are the TN mode and a STN (Super Twisted Nematic) mode in which a twist angle of the liquid crystal is set at 180° to 270° in the cell structure similar to the TN mode. The feature of this mode is that abrupt molecular orientation deformation with an increase of an applied voltage is reflected in a birefringence change by increasing the twist angle of the liquid crystal 90° or more and optimizing a deflecting plate setting angle, whereby an electro-optical characteristic having sharp threshold value is implemented. Therefore, it is suited to the simple matrix drive. On the other hand, the defect of this mode is that a background of display has color of yellow green or dark blue because of birefringence of the liquid crystal. In order to improve this defect, it is proposed that color compensation is made by piling up a panel for optical compensation or a phase difference plate formed of a high polymer such as polycarbonate on an STN panel for display, whereby white/black display can be provided. Now, this panel structure is on the market as "paper white LCD". In addition, in the case of coloring, multicolor/full-color display can be provided by the same operation principle as in the above TN mode.

When wide viewing angle is required, a GH (guest host) mode is used, in which a dye (dichromatic dye) having different absorbance between a molecule major axis direction and a minor axis direction is added to the liquid crystal. This mode is classified into the Heilmeier type using the polarizer, the White-Taylor type (phase change type) and two-layer type. In any case, as an operation principle, orientation of the dye is controlled by orientation of the liquid crystal molecule by a voltage and an absorbance difference in the direction of dye molecule is used for display. Further, in the case of coloring, as the dye, the dye absorbing a part of wavelength of visible radiation is used or the GH cell using a black dye is combined with a color filter, whereby display can be provided. In addition, detailed operation principles of the TN mode, the STN mode and the GH mode are described in "Liquid Crystal Device Handbook" (1989) pp. 315-346 of No. 142 Committee of the Japan Society for the Promotion of Science.

In the display mode using the polarizer, a utilization factor of light is decreased at least 50% because of the optical characteristic of the polarizer. Therefore, in order to implement "bright display" which is required in reflection type display or projection type display, a display with no polarizer mode is advantageous. In this respect, the White-Taylor type (phase change type) GH mode and the two-layer type GH mode among the above display modes are preferable. When both are compared, it is found that the latter is superior in contrast and brightness as shown in Proc. of the SID, 2514 (1984) pp. 275. However, since the conventional two-layer GH cell uses a normal glass substrate between the liquid crystal layers, parallax is generated in the upper and lower liquid crystal layers depending on a viewing angle, causing display blur. In order to solve this problem, it is thought that a glass thickness between the liquid crystal layers should be extremely decreased. However, it is difficult to handle it and also it is difficult to control the thickness of the cell. Therefore, it can not be applied to highly precise display having a comparatively large area. With regard to this respect the White-Taylor type GH mode is suitable because it is formed of one layer. However, it is inferior in display function as described above. Particularly, in the case of polychromatic display, because it is necessary to use a microcolor filter, brightness is lost and then brilliance of the display is reduced.

SUMMARY OF THE INVENTION

According to the present invention, there is provided a liquid crystal display comprising: a plurality of laminated liquid crystal layers; and a transparent substrate interposed between the liquid crystal layers, the transparent substrate being formed of an aggregate of optical fibers arranged so that a ray may be introduced between main and back surfaces of the substrate, whereby aberration of a display image of adjacent liquid crystal layers caused by a difference of a viewing angle can be prevented. A twist angle of the liquid crystal forming the liquid crystal layer may range from 90° to 360°. The liquid crystal forming the liquid crystal layer may be guest host liquid crystal. The liquid crystal layer can include a red, green and blue color filter layer. The transparent substrate may comprise a transparent electrode which drives the liquid crystal layer on both surfaces thereof, a part of the aggregate of the optical fibers being formed of an optical fiber whose periphery is coated with a conductive material and the transparent electrode on both surfaces of the substrate being electrically connected by the coated optical fiber. The liquid crystal may comprise a reflecting electrode on its surface.

DESCRIPTION OF THE PREFERRED EMBODIMENTS

Figure 1:
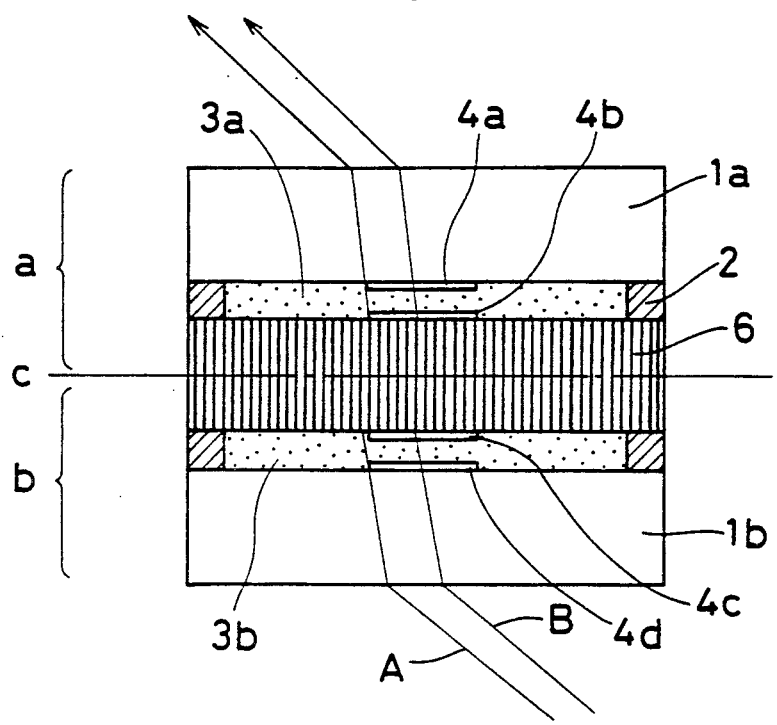
FIG. 1 is a view showing a fundamental structure of a liquid crystal display.
Figure 2:
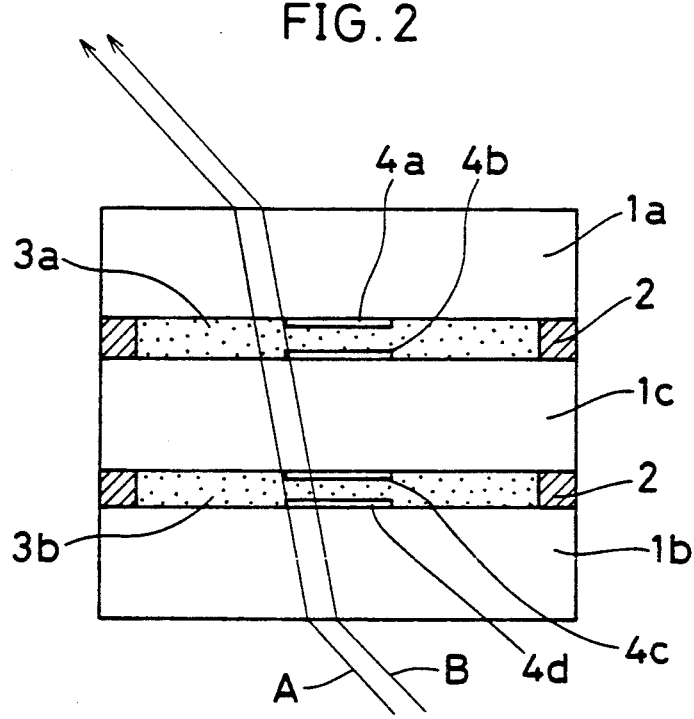
FIG. 2 is a view showing a fundamental structure of a conventional two-layer type LCD.

With reference to FIGS. 1 and 2 the main feature of the present invention will be described, for example when there are two liquid crystal layers.

FIG. 2 shows a conventional example, in which reference numerals 1a to 1c each designate a glass substrates, reference numeral 2 designates a sealing compound, reference numeral 3a designates an upper layer liquid crystal part, reference numeral 3b designates a lower layer liquid crystal part and reference numerals 4a to 4d each designate a transparent electrode. In FIG. 2, an orientation film on the transparent electrodes 4a to 4d or spacer or an insulating film for preventing leak between the liquid crystal layers which is formed in some cases are omitted for simplicity. As can be seen from FIG. 2, an incident ray A passes through an end of a display part of the lower layer liquid crystal part 3b and an incident ray B passes through an end of a display part of the upper layer liquid crystal part 3a. Therefore, parallax of a display image is generated at positions where these rays are received. This parallax is a very big problem from the viewpoint of characteristic in the display mode such as the two-layer type GH mode in which an expected display function (brightness of display, contrast, color reproductivity or the like) can not be attained until the incident ray passes through a desired laminated display part (the incident ray between A and B is displayed only by the lower layer liquid crystal part 3b).

FIG. 1 shows a fundamental structure of the present invention. This structure differs from the conventional one in that an optical fiber plate 6 is used instead of the glass substrate 1c positioned between the liquid crystal layers. The incident ray A passes through the display part of the lower layer liquid crystal part 3a and then introduced to the display part of the upper layer liquid crystal part 3a through the optical fiber plate 6 and then passes through it. Therefore, the upper and lower display parts can be optically connected for sure, whereby the problem of parallax as in the conventional example can be solved.

Although as a panel structure the liquid crystal layers 3a and 3b may be formed with one optical fiber plate 6 between as shown in FIG. 1, the same effect can be expected even when a part a and a part b shown in FIG. 1 are separately formed and then put together at C point. In this case, for LCD which requires careful attention in the process of forming a panel such as a active matrix panel or a highly precise simple matrix panel, an yield is further improved because there is no treatment on both surfaces of the substrate.

Figure 3:
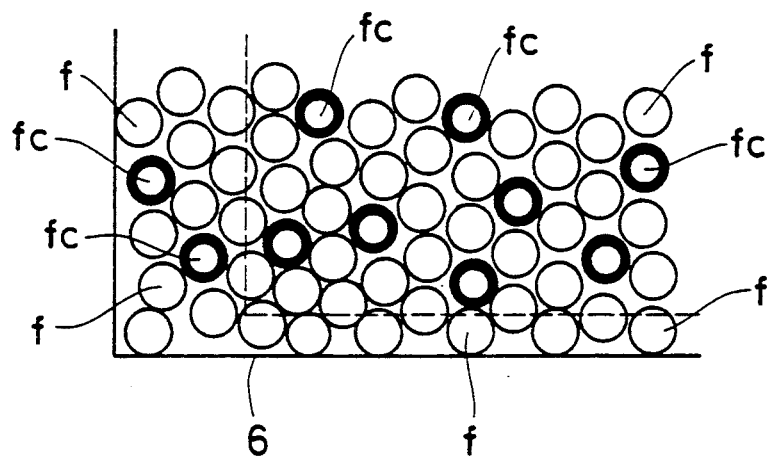
FIG. 3 is a front view showing an example of a main part of a structure of an optical fiber plate.

In addition, as regard to drive of the display part, although the upper and lower liquid crystal parts may be separately driven, a fiber plate may be used, which plate is formed by appropriately mixing a fiber fc in which a fiber periphery is coated with a conductive material (an organic material in which a conductor such as metal or carbon is diffused) into a fiber f forming the optical fiber plate 6 as shown in FIG. 3 and then processing it into the form of a plate. When the fiber plate is used, since the transparent electrodes 4b and 4c shown in FIG. 1 are shortcircuited, if a drive circuit is connected between the transparent electrodes 4a and 4d, the upper and lower liquid crystal layers can be driven at the same time by one kind of drive unit.

Such structure is very useful because a display part overlapping at the upper and lower liquid crystal layers should be driven at the same time in the display mode such as the two-layer type GH mode. In addition, in a case where it is necessary to strictly keep polarizing property while the ray is introduced to the fiber plate, the plate should be formed using a polarization plane keeping fiber as the optical fiber.

Further, the above described optical fiber is not a particular one, which has been already known (referring to, for example Image Information (I), April 1988, pp. 43 issued by Industry Development Organization in Japan).

The above described liquid crystal panel structure is extremely useful to the display mode which does not show an expected display function (brightness, contrast, color reproductivity, viewing angle or the like) until the incident ray passes through the display part overlapping over the multiple liquid crystal layers in principle. The structure is suitable for, for example monochromatic display or color display using the two-layer type GH mode or the multiple-layer phase change type GH mode. In addition, it is suitable for a transmission type display using the active matrix drive to which a two-terminal element such as a thin film transistor (TFT), MIM or diode is added or the simple matrix drive and also suitable for reflection type display, more particularly, for reflection type color display.

Therefore, the present invention attains a great effect in a portable visual apparatus such as a TV, a game or a lap top personal computer, an information processing apparatus or a projection type visual/information apparatus such as a projection type TV or display for meeting presentation.

EMBODIMENT 1

Figure 4:
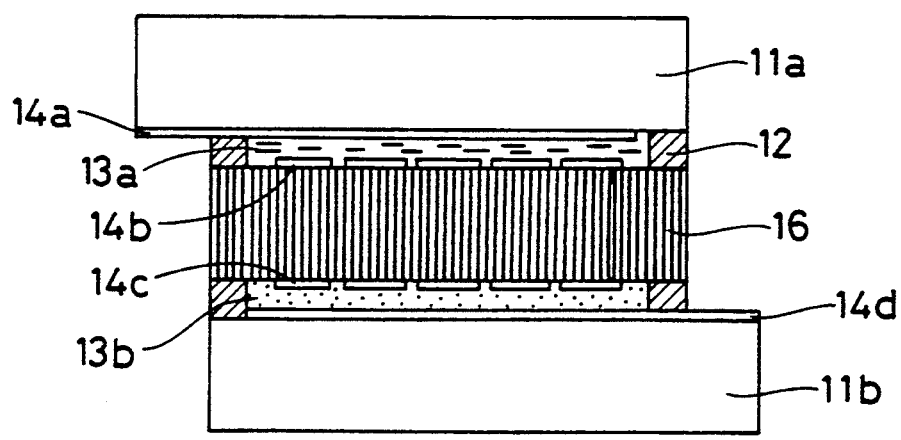
FIG. 4 is a view showing a structure of a two-layer type GH cell in accordance with an embodiment 1.

FIG. 4 shows a structure of this embodiment. In FIG. 4, reference numerals 11a and 11b each designate a glass substrate, reference numeral 12 designates a sealing compound, reference numerals 13a and 13b each designate a liquid crystal layer and reference numerals 14a to 14d each designate a transparent electrode. The liquid crystal layers 13a and 13b are formed of a liquid crystal with black guest host dye of ZLI-2327 made by Merch Co. Ltd. Parallel orientation is implemented in each of the layers by a polyimide orientation film and orientation directions of the orientation films of the liquid crystal layers 13a and 13b cross at right angles. In addition, the cell thickness of the liquid crystal layers 13a and 13b is set at 10μm and the electrodes 14a to 14d has a matrix electrode structure using ITO. Further, reference numeral 6 designates a plate formed by arranging the optical fiber having a diameter of 1 mm so that a density thereof my be 80/cm². The positions of the display parts of the liquid crystal layers 13a and 13b almost coincide with each other in a cell normal direction. When static drive is performed on all matrix electrodes so that the same voltage may be applied to the liquid crystal layers 13a and 13b and they serve as the transmission type LCD, good contrast is obtained shown and it is visually confirmed that there is no parallax generated at the display part.

In addition, when the multiplex drive is performed so that the same voltage may be applied to the display part overlapping at the liquid crystal layers 13a and 13b, it is found that character display having no parallax can be provided.

Embodiment 2

Figure 5:
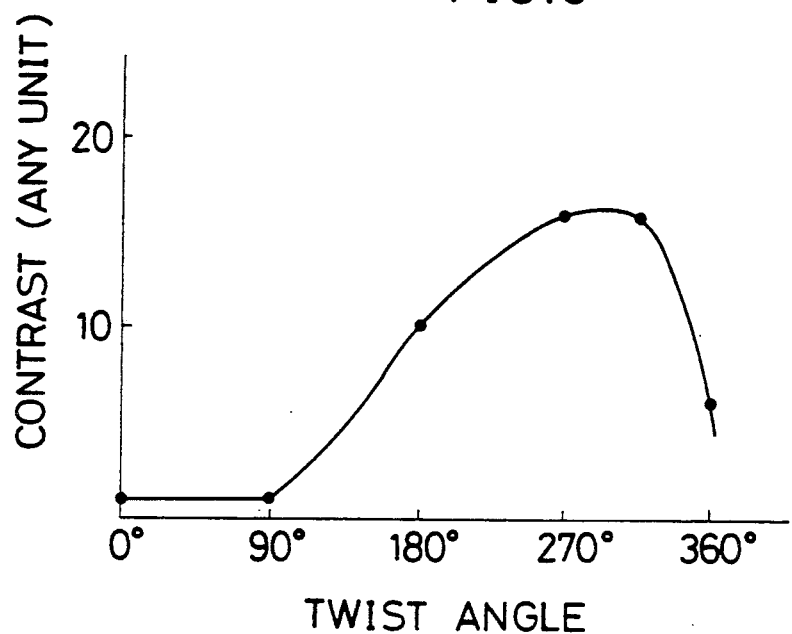
FIG. 5 is a graph showing the relation between a twist angle and contrast of the two-layer type GH cell.
Figure 6:
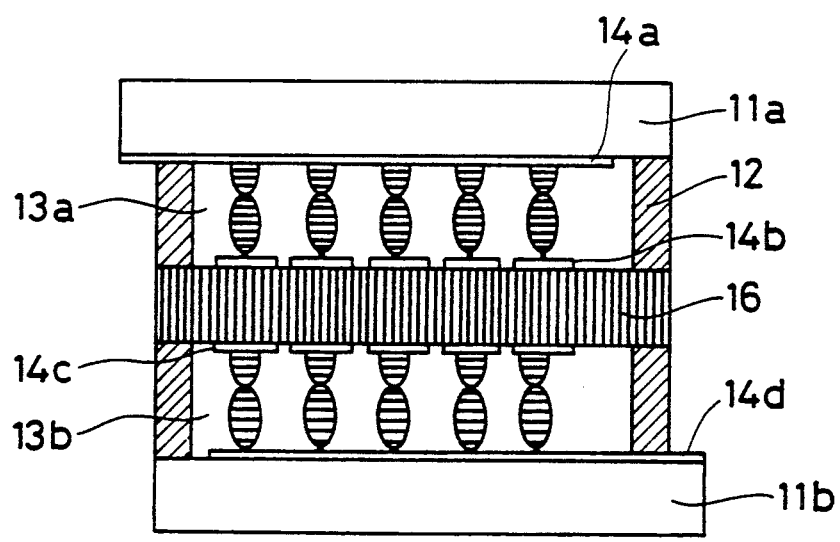
FIG. 6 is a view showing a structure of a two-layer type GH cell in accordance with an embodiment 2.

A twist angle is increased in the same two-layer type GH cell as in the first embodiment of the present invention. As the twist angle is increased, threshold characteristic becomes sharp, whereby a characteristic advantageous to the simple multiplex drive can be obtained. However, when the twist angle is 310° or more, a hysteresis characteristic appears, causing the multiplex characteristic to be degraded. FIG. 5 shows this relation. Thus, it is found that the twist angle preferably ranges between 90° and 310°. In order to obtain particularly high contrast, it should range between 180° and 310°. Such tendency can be seen by another guest host liquid crystal which is a mixture of a host material such as cyclohexane, biphenyl, pyrimidine or ester liquid crystal and a guest material such as anthraquinone, azo azometine, schiril or merocyanine dye. On the basis of the above result, FIG. 6 shows an example of the two-layer type GH cell with 240° twist. The 240° twist is implemented using the liquid crystal with black guest host dye of ZIL-2274 made by Merch Co., Ltd and also CB-15 and S-811 made by the same company as the liquid crystal. The twist directions of th liquid crystal layers 3a and 3b are opposite to each other and the orientation of liquid crystal molecule on both surfaces of the fiber plate 16 almost cross at right angles. The fiber plate, the orientation film, the cell thickness or the like is the same as in the embodiment 1.

Figure 7:
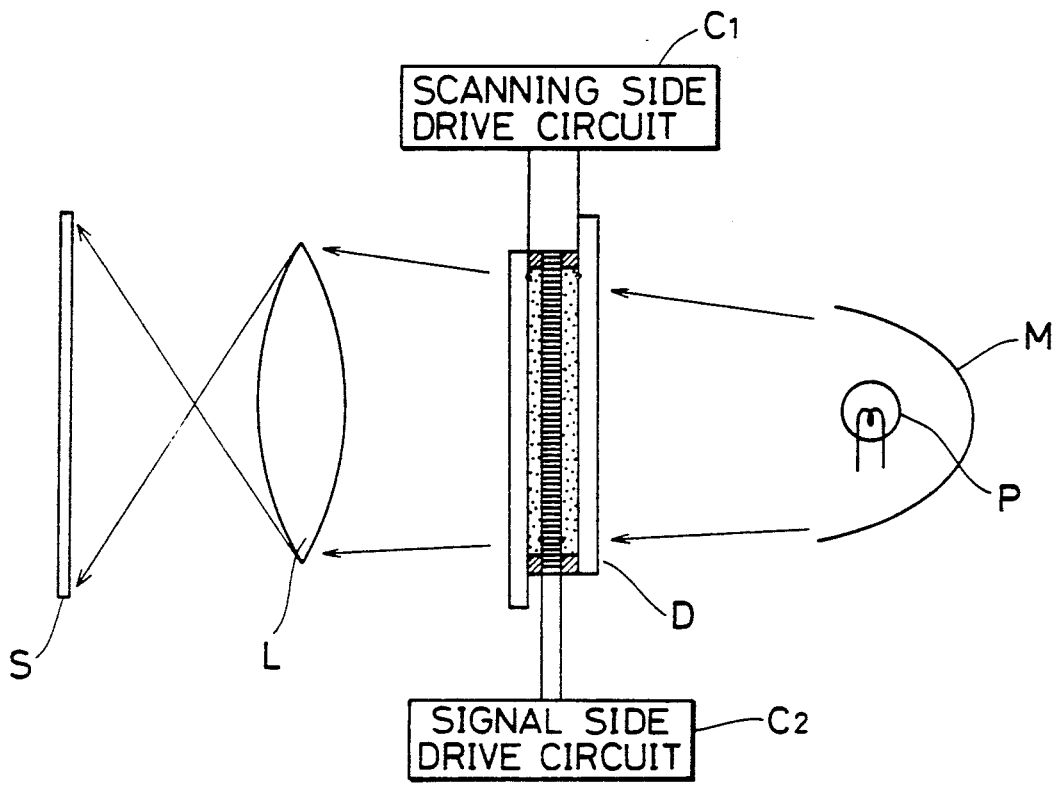
FIG. 7 is a view in which the embodiment shown in FIG. 6 is used in a projection system.

When the multiple drive is performed so that the same voltage may be applied to the display part overlapping at the liquid crystal layers 3a and 3b in the cell of the above structure, character display having good contrast and having no parallax is obtained. In addition, when this cell is projected in a projection system shown in FIG. 7, bright and clear image having no blur can be obtained. In addition, in FIG. 7, reference D designates a liquid crystal display, reference numeral C1 designates a scanning side drive circuit, reference numeral C2 designates a signal side drive circuit, reference P designates a light source, reference M designates a reflection mirror, reference L designates a lens and reference S designates a screen.

Embodiment 3

Figure 8:
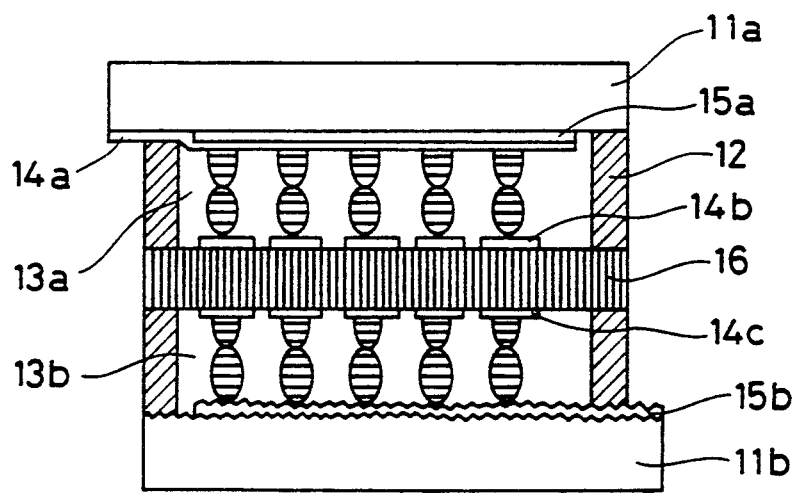
FIG. 8 is a view showing a fundamental structure of a reflection type color LCD in accordance with an embodiment 3.

In the same fundamental cell structure in the embodiment 2 (shown in FIG. 6), a red, green and blue color filter layer 15a having a thickness of 0.7 μm and made of gelatin is formed between the transparent electrode 4a and the glass substrate 11a. Then, instead of the transparent electrode 14d, the glass substrate 1 is polished with antifriction (alumina particle diameter is 15 μm) and etching is performed with HF to roughen the substrate surface and then Ag is deposited, whereby a reflecting electrode 15b is formed. FIG. 8 shows this cell structure.

When multiplex drive is performed by applying a voltage between the electrodes 14a and 14b and between the electrodes 14c and 15c and applying the same voltage to the display part overlapping at the liquid crystal layers 13a and 13b, good reflection type half tone display and non-gradation display can be provided. Therefore, a reflection type color LCTV or color display for a notebook type personal computer can be basically formed by this structure.

Although the position of the color filter is between the electrode 14a and the glass substrate 11a in this embodiment, it can be between the electrode 14b and the plate 16 or between the electrode 14c and the plate 16 or on the electrode 15.

Embodiment 4

Figure 9:
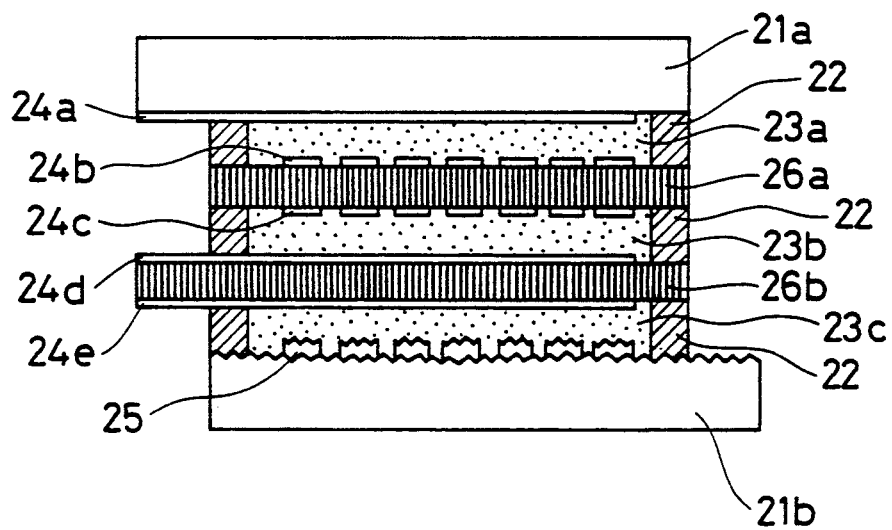
FIG. 9 is a view showing a fundamental structure of a three-layer laminated reflection type color LCD in accordance with an embodiment 4.

FIG. 9 shows a cell structure of this embodiment. In FIG. 9, reference numerals 21a and 21b each designate a glass substrate, reference numerals 26a and 26b each designate an optical fiber plate, reference numerals 23a to 23c each designate a liquid crystal layer, reference numeral 22 designates a sealing compound and reference numerals 24a to 24e each designate a transparent electrode. According to this embodiment of the present invention, three layers of GH liquid crystal are laminated and color display is made by subtractive color mixture. The three layers are connected by the optical fiber plates 26a and 26b. In addition, reference numeral 25 designates a reflecting electrode formed in the same manner as in the embodiment 3. A polyimide vertical orientation agent is used on the surface of each substrate and the cell thickness of the liquid crystal cell and a spiral pitch of the liquid crystal are adjusted to 8 μm and 4 μm, respectively. In this embodiment ZLI-1840 made by Merch Co., Ltd is used as the host liquid crystal and 2 wt % of G209 and G232 made by Japan Photo Dye Co., Ltd and D35 made by BDH Co., Ltd are used in the liquid crystal layers 23a to 23c as the guest. Further, the display part of each layer is bonded so as to overlapped with each other as much as possible.

When a voltage is separately applied to the liquid crystal cell of each layer by the multiplex drive, eight-color multicolor display can be provided without display blur due to parallax by combination of a phase change state and non-phase change state of each layer.

The guest host material is not limited to that used in this embodiment and a material which displays cyanogen, magenta and yellow may be used in eight-color multicolor or full-color display by subtractive color mixture.

Although the simple multiplex type panel structure is used in the above embodiments 1 to 4, if an active matrix type substrate is used, on which a three-terminal element such as a thin film transistor (TFT) or a two-terminal element such as MIM is formed, still better display characteristic can be obtained. In addition, although all non-display parts are in a light-interrupted state in this embodiment, the non-display part becomes a light-transmitted state if the host liquid crystal material having negative dielectric constant anisotropy is used and vertical orientation or inclined orientation is used together or vertical orientation is implemented by depositing SiO on the non display part very thinly (for example approximately 50 Å) only in the embodiments 1 to 3. In the embodiment 4 it is known that the non-display part becomes light-transmitted state if a step difference is provided on condition that the liquid crystal cell thickness is smaller that the spiral pitch of the host liquid crystal only in the non-display part. This kind of panel structure is particularly useful when the reflection type LCD is implemented because a utilization factor of light is improved in this structure.

According to the present invention, there is provided a highly precise and bright liquid crystal display.

While only certain presently preferred embodiments have been described in detail, as will be apparent with those skilled in the art, certain changes and modifications can be made without departing from the scope of the invention as defined by the following claims.

What is claimed is:

1. A liquid crystal display device comprising:
   a plurality of liquid crystal layers;
   an optical fiber substrate interposed therebetween;
   a pair of transparent substrates disposed on the top and the bottom of the plurality of liquid crystal layers, electrodes of the same pattern disposed on both side of the optical fiber sustrate; and
   electrodes disposed on the inner sides of the pair of transparent substrates,
   wherein the optical fiber substrate is formed of an aggregate of optical fibers arranged so that a ray of light incident upon the optical fiber substrate perpendicularly passes therethrough, whereby the aberration of a display image of the plurality of liquid crystal layers caused by the difference of a viewing angle can be prevented.

2. A liquid crystal display of claim 1, wherein each liquid crystal layer comprises a liquid crystal inserted between the substrates whose twist angle ranges from 90° to 360°.

3. A liquid crystal display of claim 1, wherein the liquid crystal layer comprises a guest host liquid crystal.

4. A liquid crystal display of claim 1, wherein the liquid crystal layers comprise three layers of guest host liquid crystals which provide a multicolor display by manipulation of a phase change state and a non-phase change state of each layer.

5. A liquid crystal display of claim 1, wherein the electrodes include a reflecting electrode.

6. A liquid crystal display device comprising:
   a plurality of liquid crystal layers;
   an optical fiber substrate interposed therebetween;
   a pair of transparent substrates disposed on the top and the bottom of the plurality of liquid crystal layers;
   electrodes of the same pattern disposed on both sides of the optical fiber substrate; and
   electrodes disposed on the inner sides of the pair of transparent substrates,
   wherein the optical fiber substrate comprises fibers whose periphery is coated with a conductive material for short circuiting across the electrodes on the both sides of the optical fiber substrate.

7. A liquid crystal display of claim 1 or 6, wherein the two adjacent liquid crystal layers comprise two liquid crystal layers whose twist directions are opposite to each other.

8. A liquid crystal display of claim 1 or 6, wherein the orientations of liquid crystal molecules on both sides of the optical fiber substrate cross at right angles.

9. A liquid crystal display of claim 1 or 6, wherein the liquid crystal layers comprise materials to display cyanogen, magenta and yellow.

* * * * *